(12) United States Patent
Zorgel et al.

(10) Patent No.: US 11,970,129 B2
(45) Date of Patent: Apr. 30, 2024

(54) TENSIONING APPARATUS FOR A SAFETY BELT COMPONENT

(71) Applicant: AUTOLIV DEVELOPMENT AB, Vargarda (SE)

(72) Inventors: Zoltan Zorgel, Brasov (RO); Stefan Dan, Brasov (RO); Robert Bugulet, Brasov (RO); Paul Imre, Baia Mare (RO)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 17/929,016

(22) PCT Filed: Feb. 9, 2021

(86) PCT No.: PCT/EP2021/052991
§ 371 (c)(1),
(2) Date: Aug. 10, 2022

(87) PCT Pub. No.: WO2021/160569
PCT Pub. Date: Aug. 19, 2021

(65) Prior Publication Data
US 2023/0079656 A1    Mar. 16, 2023

(30) Foreign Application Priority Data

Feb. 14, 2020    (DE) ..................... 10 2020 103 913.1

(51) Int. Cl.
B60R 22/195    (2006.01)
(52) U.S. Cl.
CPC ...... B60R 22/1952 (2013.01); B60R 22/1955 (2013.01); *B60Y 2410/12* (2013.01)

(58) Field of Classification Search
CPC .................. B60R 22/1952; B60R 22/1955
See application file for complete search history.

(56) References Cited

U.S. PATENT DOCUMENTS

| 7,533,902 B2 * | 5/2009 | Arnold | B60R 22/1952 60/632 |
| 8,011,696 B2 * | 9/2011 | Singer | B60R 22/1952 60/632 |

(Continued)

FOREIGN PATENT DOCUMENTS

| DE | 102005050426 B3 * | 3/2007 | ......... B60R 22/1952 |
| DE | 112013001143 T5 | 11/2014 | |

(Continued)

*Primary Examiner* — Barry Gooden, Jr.
(74) *Attorney, Agent, or Firm* — DICKINSON WRIGHT PLLC

(57) ABSTRACT

The present invention relates to a tensioning apparatus for a safety belt component and to a method for producing such a tensioning apparatus, comprising a gas generator for generating a pressurized gas, a piston which can be driven by the pressurized gas, a traction cable which is connected to the piston and can be connected to a safety belt component to be set into tensioning motion, and a tensioner tube for receiving and guiding the piston, wherein the gas generator is located in the tensioner tube, the tensioner tube has a cut-out in the jacket thereof between the gas generator and the piston, and a cable deflection is provided, by means of which the traction cable is guided through the cut-out and out of the tensioner tube.

6 Claims, 3 Drawing Sheets

(56) References Cited

U.S. PATENT DOCUMENTS

| | | | |
|---|---|---|---|
| 8,814,211 B1 * | 8/2014 | Kohlndorfer | B60R 22/1952 |
| | | | 280/806 |
| 9,162,647 B2 * | 10/2015 | Inagawa | B60R 22/18 |
| 9,517,748 B2 * | 12/2016 | Söhnchen | A44B 11/2576 |
| 9,834,174 B2 * | 12/2017 | Kacprzak | B60R 22/1952 |
| 2001/0035643 A1 | 11/2001 | Mueller | |
| 2003/0230872 A1 | 12/2003 | Sakai et al. | |
| 2005/0269148 A1 * | 12/2005 | Koide | B60R 22/1951 |
| | | | 280/806 |
| 2007/0278779 A1 | 12/2007 | Arnold | |
| 2011/0068614 A1 | 3/2011 | Sugiyama et al. | |
| 2011/0221178 A1 | 9/2011 | Lane, Jr. | |
| 2011/0316265 A1 * | 12/2011 | Lane, Jr. | B60R 22/1955 |
| | | | 280/806 |
| 2014/0265288 A1 | 9/2014 | Kohlndorfer et al. | |
| 2016/0368451 A1 * | 12/2016 | Kacprzak | B60R 22/4619 |
| 2022/0203929 A1 * | 6/2022 | Gray | B60R 22/4604 |

FOREIGN PATENT DOCUMENTS

| | | |
|---|---|---|
| DE | 102020207374 A1 * | 12/2021 |
| WO | 2007/139599 A1 | 12/2007 |
| WO | 2017/005718 A1 | 1/2017 |
| WO | WO-2021124981 A1 * | 6/2021 |
| WO | WO-2023179980 A1 * | 9/2023 |

* cited by examiner

TENSIONING APPARATUS FOR A SAFETY BELT COMPONENT

CROSS-REFERENCE TO RELATED APPLICATIONS

This application is a 35 U.S.C. § 371 national phase of PCT International Application No. PCT/EP2021/052991, filed Feb. 9, 2021, which claims the benefit of priority under 35 U.S.C. § 119 to German Patent Application No. 10 2020 103 913.1, filed Feb. 14, 2020, the contents of which are incorporated herein by reference in its entirety.

FIELD OF THE INVENTION

The present invention relates to a tensioning apparatus for a safety belt component, comprising a gas generator for generating a pressurized gas, a piston which can be driven by the pressurized gas, a traction cable which is connected to the piston and can be connected to the seat belt component to be set into a tensioning motion, and a tensioner tube for receiving and guiding the piston.

BACKGROUND

Such a tensioning apparatus is known, for example, from DE 10 2015 111 083 B4, wherein the piston is guided in a tensioner tube. The tensioner tube is connected to a deflection block which is produced in a die casting process and forms a cable deflection for the traction cable and forms a receptacle for the gas generator and a pressure chamber into which the pressurized gas produced by the gas generator flows. The use of the deflection block connected to the tensioner tube at the end face requires a component, which is relatively expensive to produce and which also requires a relatively large amount of space.

The object of the present invention is therefore to at least partially eliminate the problems described with respect to the prior art and to specify a tensioning apparatus and a method for producing a tensioning apparatus with which the production of a tensioning apparatus is simplified and/or is less expensive, wherein the tensioning apparatus requires less space.

SUMMARY

The object is achieved by a tensioning apparatus and a method having the features as described herein. Advantageous developments of the tensioning apparatus and of the method are specified in the description, wherein individual features of the advantageous developments can be combined with one another in a technically expedient manner.

The object is achieved in particular by a tensioning apparatus having the features mentioned at the outset, wherein the gas generator is arranged in the tensioner tube, the tensioner tube has a cut-out in the jacket thereof between the gas generator and the piston and a cable deflection is provided, by means of which the traction cable is guided through the cut-out and out of the tensioner tube.

In its basic concept, the invention therefore provides that the gas generator itself is arranged in the tensioner tube and that the cable deflection already begins in the tensioner tube itself, so that the traction cable is guided out through the jacket of the tensioner tube. In this way, there is no need for a deflection block which is complex to produce, with space also being saved as a result.

The gas generator is thus arranged, in particular with its portion that emits the pressurized gas in the event of tripping, completely within the tensioner tube. In particular, the gas generator is arranged such that only its (electrical) connections are accessible from outside the tensioner tube. The gas generator is in particular arranged at one end of the tensioner tube, wherein the connections of the gas generator are accessible from the end face of the tensioner tube. In particular, it can be provided that the tensioner tube has a reduction in diameter at the end that receives the gas generator, so that the gas generator is secured against removal in a form-fitting manner on said side of the tensioner tube.

In the event of tripping, the piston is accelerated by the gas generated by the gas generator in the direction of the end of the tensioner tube opposite the gas generator, wherein the piston pulls the traction cable through the cut-out, for which purpose the cut-out is arranged between the gas generator and the piston in the jacket of the tensioner tube.

In order to prevent the traction cable from resting directly on the tensioner tube in the region of the cut-out in the event of tripping, at least one further component is provided as a cable deflection, which guides the traction cable to/through the cut-out in the tensioner tube at least during the tensioning motion. In this case, the cable deflector is designed in particular such that the traction cable is deflected out of the substantially axially parallel alignment in the tensioner tube into an oblique (in particular orthogonal) alignment thereto outside the tensioner tube. The traction cable thus runs obliquely to the tensioner tube outside the tensioner tube.

In this case, it is provided in particular that the cut-out in the tensioner tube is arranged in a linear portion of the tensioner tube, so that the traction cable runs outside the tensioner tube obliquely to the linear portion. In this context, it is preferred that the tensioner tube is linear, i.e., without curvature along its longitudinal extension, over its entire extension.

The cable deflector is in particular designed in two or more parts and has a guide part inserted into the tensioner tube and a fixing part which engages through the cut-out from outside the tensioner tube. The guide part is thus designed, in particular with regard to its outer diameter and its circumferential design, such that it can be inserted into the tensioner tube from one end of the tensioner tube during the assembly of the tensioning apparatus. By contrast, the fixing part is designed and matched to the cut-out in the tensioner tube such that it can be inserted with a portion into the cut-out from outside the tensioner tube, wherein a substantial portion of the fixing part is preferably mounted outside the tensioner tube.

In a preferred embodiment, it is provided that the guide part has a recess into which the fixing part engages with a projection. In this case, a shaping of at least one portion of the projection corresponds to a complementary shape of at least one portion of the recess, so that the guide part and the fixing part can be aligned exactly with one another during assembly. In this case, the recess in the guide part is formed in a region of the guide part which, in the mounted state, faces the cut-out in the tensioner tube, while the projection is designed in particular such that, in the mounted state, it is arranged within the tensioner tube and in particular engages behind a portion of the tensioner tube adjoining the cut-out in the tensioner tube.

The guide part and the fixing part can each form a deflection for the traction cable in their own right or jointly, so that the traction cable is guided out of the tensioner tube in particular in such a way that it cannot come into contact with the tensioner tube.

While it is sufficient in principle that the gas generator and the cable deflector can be mounted individually in/on the tensioner tube, it is preferred if, in particular, the guide part of the cable deflector has a receptacle in which the gas generator is arranged. In particular, the gas generator with its portion which ejects the pressurized gas is arranged within the receptacle of the guide part. It can thus be achieved that the guide part can be used not only to deflect the cable, but also that the guide part simultaneously provides a seal for the pressurized gas, so that the pressurized gas does not escape from the tensioner tube at unintentional places in the event of tripping. In addition, it can thus be achieved that the gas generator is pre-assembled in the guide part and that the guide part and the gas generator are arranged together in the tensioner tube during production.

It can also be provided that the guide part forms at least one pressurized gas duct, which extends along the extension of the tensioner tube to the piston end of the guide part. The pressurized gas ducts are in particular tubular (possibly curved) in the guide part and extend from an inlet facing the gas generator to an end of the guide part which faces the piston. With the at least one pressurized gas duct, the pressurized gas escaping the gas generator can thus be fed in a targeted manner to the space between the guide part and the piston, without the traction cable being pressurized by the hot pressurized gas in the region of the guide part.

In addition, the guide part can be designed such that it has a deflection for the traction cable, wherein the deflection extends from the piston end of the guide part to the cut-out in the tensioner tube. In particular, the guide part has a recess for this purpose, in/on which the traction cable is arranged and on which the traction cable rests.

At the piston end, the guide part can also be designed such that it completely encloses the traction cable and thereby forms a type of lip seal. In this way, the pressurized gas from the space between the guide part and the piston is prevented from reaching the cut-out in the tensioner tube along the deflection formed by the guide part.

The fixing part has in particular an opening through which the traction cable is guided in the mounted state.

In a preferred embodiment, the traction cable is thus first enclosed by the guide part by means of a lip seal, is subsequently guided together through the projection of the fixing part and the deflection on the guide part to the cut-out and subsequently guided further through the opening of the fixing part.

The portion of the fixing part arranged outside the tensioner tube is held on the tensioner tube by means of a holder. The holder is in particular shaped such that it surrounds the tensioner tube on the outside and is fastened to the fixing part with its two ends. The holder can be fastened to the fixing part by means of screws or rivets. It is also possible for the tensioning apparatus to be fastened in this region to a motor vehicle. In section, the holder preferably has a U shape or keyhole shape.

Therefore, an in particular linear tensioner tube is initially provided to produce the tensioning apparatus. The gas generator is then inserted into the tensioner tube. In this case, it can be provided that the gas generator is initially pre-assembled in an element, in particular in the guide part of the cable deflector, and that the guide part and the gas generator are inserted together into the tensioner tube. Subsequently, the cable deflection is fixed to the tensioner tube, for which purpose the fixing part in particular is introduced through the cut-out into the guide part from the outside. In addition, the fixing part can be fastened in its position on the tensioner tube by means of a holder.

In addition, the traction cable is introduced into the tensioner tube and guided through the cable deflection. In addition, the piston is fastened to the traction cable. In this case, however, the sequence of steps is irrelevant, unless technically absolutely necessary.

BRIEF DESCRIPTION OF THE DRAWINGS

The invention and the technical environment are explained below by way of example with reference to the figures. The following are shown schematically.

DETAILED DESCRIPTION

Figure 1:
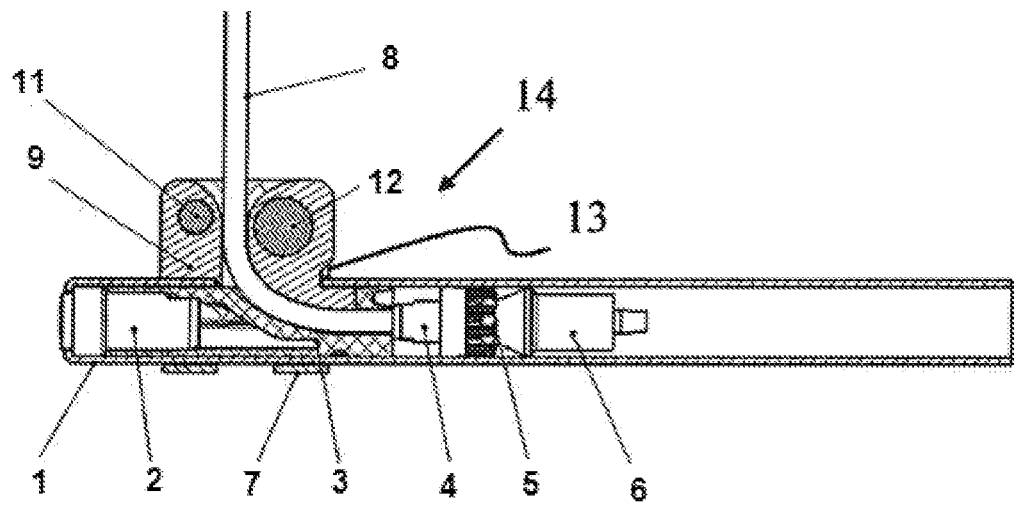
FIG. 1: a sectional view through the tensioning apparatus.
Figure 2:
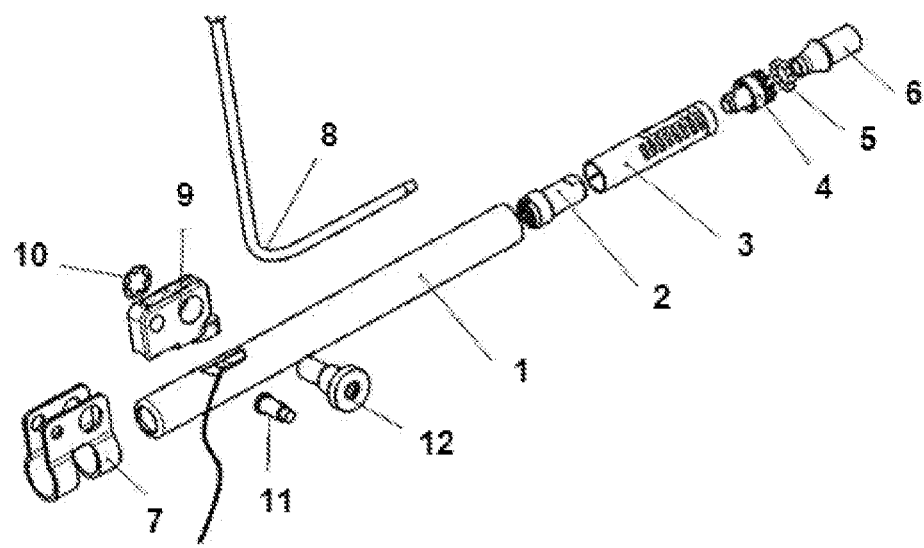
FIG. 2: an exploded view of the tensioning apparatus.

The tensioning apparatus shown in FIGS. 1 and 2 comprises a tensioner tube 1 and a traction cable 8, with a piston 4 being attached to the end of the traction cable 8 arranged in the tensioner tube 1, which piston 4 is fastened to the traction cable 8 by means of a fastening 6, wherein balls 5 facilitate a low-friction guiding of the piston 4 in the tensioner tube 1. A cut-out 13 is formed in the jacket of the tensioner tube 1.

The tensioning apparatus also comprises a cable deflector 14, by means of which the traction cable 8 is guided through the cut-out 13 in the tensioner tube 1. The cable deflector 14 comprises a guide part 3, with a gas generator 2 being arranged in the receptacle 15 of the guide part 3 facing away from the piston 4. The cable deflector 14 also comprises a fixing part 9 which engages with a projection 19 through the cut-out 13 in the tensioner tube 1. The fixing part 9 is fastened to the tensioner tube 1 by means of a holder 7 via a rivet 11 and a screw 12, wherein the holder 7 encompasses the tensioner tube 1 on the outside.

Figure 3:
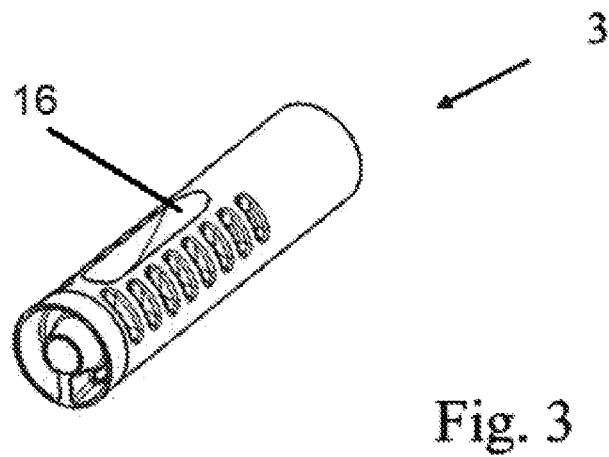
FIG. 3: a perspective view of a guide part of the tensioning apparatus.
Figure 4:
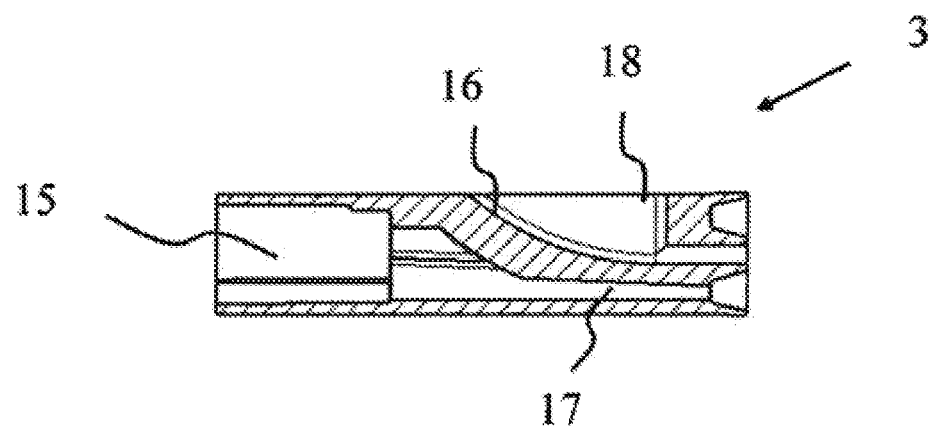
FIG. 4: a sectional view through the guide part.
Figure 5:
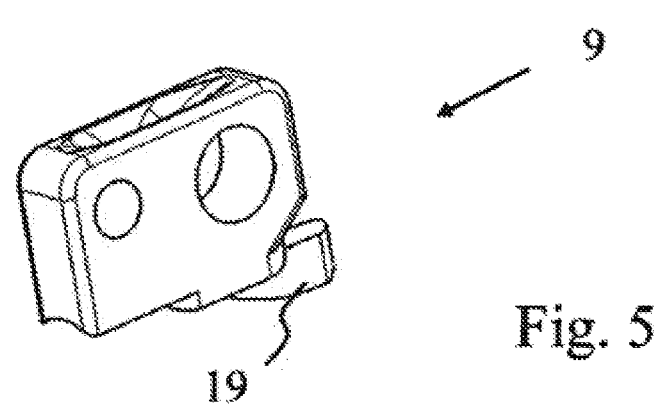
FIG. 5: a perspective view of a fixing part of the tensioning apparatus.
Figure 6:
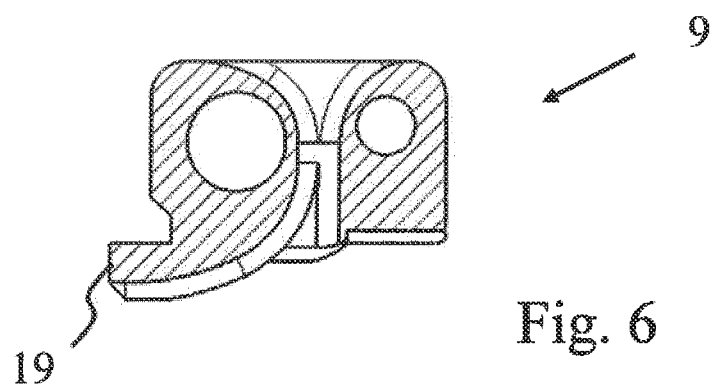
FIG. 6: a sectional view through the fixing part.

As can be seen in particular from the combination of FIGS. 3 and 4, the guide part 3 has a receptacle 15 for the gas generator 2. In addition, the guide part 3 forms a plurality of pressurized gas ducts 17, which extend from the receiving side to the end of the guide part 3 which faces the piston 4.

The guide part 3 also forms a deflection 16, by means of which the traction cable 8 is fed to the cut-out 13 in the tensioner tube 1.

In addition, it can be seen from the combination of FIGS. 3 to 6 that the fixing part 9 has a projection 19, which, in the mounted state, engages in a recess 18 formed in the guide part 3.

In the event of tripping, the gas generator 2 generates pressurized gas which is guided along past the deflection 16 through the pressurized gas ducts 17, so that the hot pressurized gas does not directly pressurize the traction cable 8 in the region of the guide part 3. The guide part 3 is designed in such a way that pressurized gas can escape from the guide part 3 only along the pressurized gas ducts 17. The pressurized gas escaping the guide part 3 accelerates the piston 4 in the figures to the right, so that the traction cable 8 is pulled into the tensioner tube 1, wherein the cable deflection 14 prevents the traction cable 8 from coming directly into contact with the tensioner tube 1.

For simplified assembly, the gas generator 2 can first be introduced into the receptacle 15 of the guide part 3 and then inserted together with the guide part 3 into the tensioner tube 1. The guide part 3 is then fixed by means of the fixing part 9 in that the fixing part 9 with its projection 19 is introduced into the recess 18 of the guide part 3. The fixing part 9 is then fixed to the tensioner tube 1 by means of the holder 7. In addition, the traction cable 8 is introduced into the tensioner tube 1 through the cable deflector 14, wherein the piston 4 can be fixed beforehand or subsequently with the fastening 6.

While the above description constitutes the preferred embodiment of the present invention, it will be appreciated that the invention is susceptible to modification, variation and change without departing from the proper scope and fair meaning of the accompanying claims.

LIST OF REFERENCE SIGNS

1 Tensioner tube
2 Gas generator
3 Guide part
4 Piston
5 Ball
6 Fastening
7 Holder
8 Traction cable
9 Fixing part
10 Washers
11 Rivet
12 Screw
13 Cut-out
14 Cable deflector
15 Receptacle
16 Deflection
17 Pressurized gas duct
18 Recess
19 Projection

The invention claimed is:

1. A tensioning apparatus for a safety belt component, comprising;
   a gas generator for generating a pressurized gas,
   a piston that can be driven by the pressurized gas,
   a traction cable connected to the piston, the traction cable adapted to be connected to the safety belt component for transmitting a tensioning motion,
   a tensioner tube for receiving and guiding the piston,
   wherein the gas generator is arranged in the tensioner tube,
   the tensioner tube has a cut-out thereof between the gas generator and the piston, and
   a cable deflector for guiding the traction cable through the cut-out and out of the tensioner tube, the cable deflector comprising a guide part inserted into the tensioner tube along an extension of the tensioner tube and forming a deflection for the traction cable extending from a piston end of the cable deflector to the cut-out in the tensioner tube, and a fixing part which engages through the cut-out from an outside wherein the traction cable is guided through the fixing part, and wherein the guide part has a cut-out into which the fixing part engages with a projection.

2. The tensioning apparatus according to claim 1, wherein the guide part has a receptacle and wherein the gas generator is arranged in the receptacle.

3. The tensioning apparatus according to claim 1, wherein the guide part forms at least one pressurized gas duct, wherein the at least one pressurized gas duct extends along the extension of the tensioner tube to the piston end of the guide part.

4. The tensioning apparatus according to claim 1, wherein the fixing part is held on the tensioner tube by a holder.

5. The tensioning apparatus according to claim 1, wherein the cut-out is arranged in a linear portion of the tensioner tube.

6. The tensioning apparatus according to claim 1, wherein the tensioner tube is linear over an entire extension thereof.

\* \* \* \* \*